(12) United States Patent
Lee et al.

(10) Patent No.: US 8,872,645 B2
(45) Date of Patent: Oct. 28, 2014

(54) METHOD FOR ROAD GRADE ESTIMATION FOR ENHANCING THE FUEL ECONOMY INDEX CALCULATION

(75) Inventors: Jin-Woo Lee, Rochester Hills, MI (US); Bakhtiar Brian Litkouhi, Washington, MI (US); Elizabeth S Nunning, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 531 days.

(21) Appl. No.: 13/036,071

(22) Filed: Feb. 28, 2011

(65) Prior Publication Data

US 2012/0218094 A1    Aug. 30, 2012

(51) Int. Cl.
*B60Q 1/00* (2006.01)
*G01C 9/00* (2006.01)
*B60W 40/076* (2012.01)

(52) U.S. Cl.
CPC .............. *G01C 9/00* (2013.01); *B60W 2540/10* (2013.01); *B60W 2530/10* (2013.01); *B60W 2510/105* (2013.01); *B60W 2510/0604* (2013.01); *B60W 2510/0638* (2013.01); *B60W 40/076* (2013.01); *B60W 2510/0657* (2013.01); *B60W 2520/105* (2013.01)
USPC ........ 340/439; 340/425.5; 340/438; 702/127; 702/150; 702/154

(58) Field of Classification Search
CPC ....... G01C 9/00; G01C 21/10; B60W 40/076; B60W 2550/142
USPC ................................................ 340/425.5, 438
See application file for complete search history.

(56) References Cited

U.S. PATENT DOCUMENTS

| | | | |
|---|---|---|---|
| 2008/0177451 A1* | 7/2008 | Saitou et al. | 701/55 |
| 2009/0024354 A1* | 1/2009 | Osaki et al. | 702/154 |
| 2009/0265058 A1* | 10/2009 | Hasegawa et al. | 701/29 |
| 2009/0309793 A1* | 12/2009 | Loomis | 342/357.14 |
| 2010/0211240 A1* | 8/2010 | Crombez | 701/22 |

* cited by examiner

*Primary Examiner* — Daniel Wu
*Assistant Examiner* — Kam Ma

(57) ABSTRACT

A method is provided of estimating a road grade of a current driven road. A nominal value of a vehicle operating parameter is measured during a nominal vehicle operating condition. The vehicle operating parameter is related to a vehicle thrust power. The nominal value of the vehicle operating condition is comprised of a nominal acceleration corresponding to the nominal value when the vehicle is driven on a substantially non-inclined road. The nominal value and nominal acceleration is stored in a memory. An actual value of the vehicle operating parameter is determined during a current vehicle operating condition. A vehicle acceleration corresponding to the actual value of the vehicle operating parameter is measured. The road grade of the current driven road is estimated as a function of a comparison between the measured acceleration value and the nominal acceleration that would be expected for the actual value of the vehicle operating parameter.

16 Claims, 2 Drawing Sheets

METHOD FOR ROAD GRADE ESTIMATION FOR ENHANCING THE FUEL ECONOMY INDEX CALCULATION

BACKGROUND OF INVENTION

An embodiment relates generally to enhancing the accuracy of fuel economy indicators.

Fuel economy is an easy determination when a vehicle is traveling along a flat, non-inclined road surface; however, fuel economy can change significantly when the vehicle is traveling on an inclined surface. To determine the fuel economy on an inclined surface accurately, the angle of inclination of the traveled road surface is commonly required. However, to determine an angle of inclination, additional sensors in the vehicle would be required. GPS could be used to determine the angle of inclination; however, GPS measurements are updated at a slow rate (1 hz). Therefore, the vehicle could travel as much as a few tens of meters before the fuel economy is updated based on the GPS data transmission rate.

SUMMARY OF INVENTION

An advantage of an embodiment is estimation of an inclination of a road utilizing at least one existing vehicle operating parameters of the vehicle such as axle torque, engine rpm, throttle position, and accelerator position. The estimation of the road grade is used to improve the accuracy of a fuel economy index calculation. The fuel economy index can be used to determine a powertrain advising operation. The powertrain advising operation provides information to a driver of the vehicle relating to instant fuel economy, manual transmission shifting advising, and acceleration profile advising.

An embodiment contemplates a method of estimating a road grade of a current driven road by a vehicle. A nominal value of a vehicle operating parameter is measured during a nominal vehicle operating condition. The vehicle operating parameter is related to a vehicle thrust power. The nominal value of the vehicle operating condition is comprised of a nominal acceleration corresponding to the nominal value when the vehicle is driven on a substantially non-inclined road. The nominal value and nominal acceleration is stored in a memory. An actual value of the vehicle operating parameter is determined during a current vehicle operating condition. A vehicle acceleration corresponding to the actual value of the vehicle operating parameter is measured. The road grade of the current driven road is estimated as a function of a comparison between the measured acceleration value and the nominal acceleration that would be expected for the actual value of the vehicle operating parameter.

DETAILED DESCRIPTION

Figure 1:
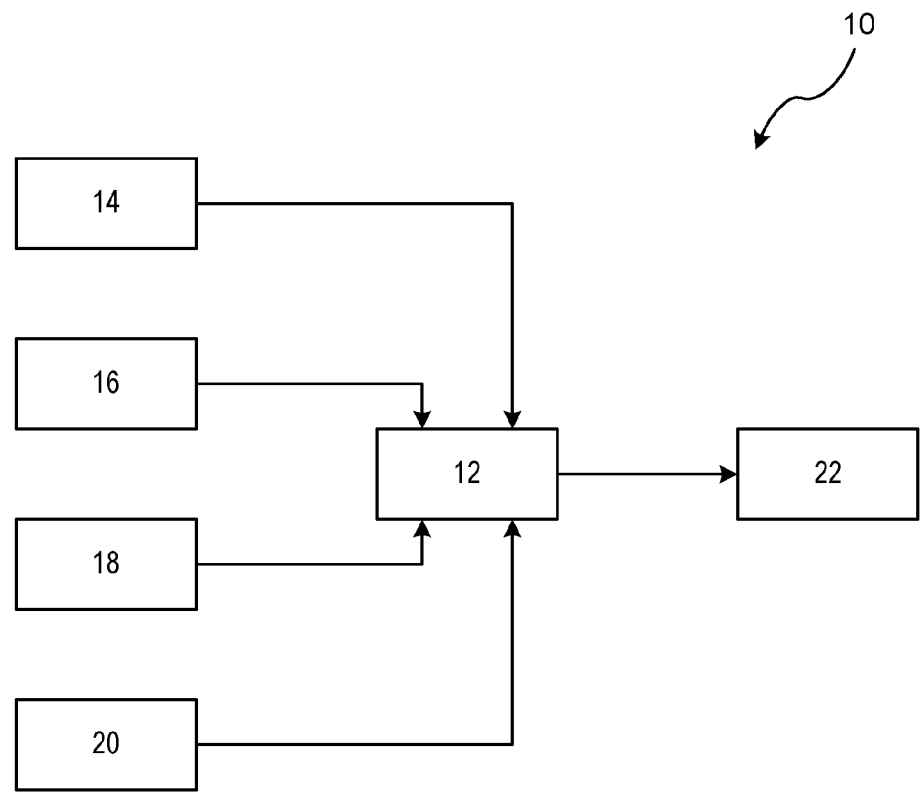
FIG. 1 is a block diagram of a system for estimating a road grade of a road.

There is shown in FIG. 1 a system for estimating a road angle of inclination that can be used to determine a fuel economy index for a vehicle traveling along a road. The determined road grade is used in enhancing the accuracy of a fuel economy index that is used in a respective powertrain advising operation. A control unit 12 monitors at least one vehicle operating parameter. The vehicle operating parameter relates to a power thrust of the vehicle when the vehicle is traveling along a road. The vehicle operating parameters may include, but are not limited to, axle torque 14, engine rpm 16, throttle position 18, and accelerator pedal position 20. At least one of the values of the vehicle operating parameters are measured and provided to the control unit 12. The control unit 12 in cooperation with other factors, as will be described herein, estimates the road grade of the currently traveled road. The road grade estimate is then used to determine a fuel economy index for the vehicle traveling along the current road. The fuel economy index may be used in a powertrain advising operation. The powertrain advising operation may be provided to a user via an indicator 22. The indicator 22 may include an instant fuel economy indicator, a gear shift advisor, or an acceleration/deceleration advisor for suggesting a profile for accelerating/decelerating a vehicle.

To accurately determine instant fuel economy, gear shift advising, and acceleration/deceleration advising, the inclination of the road is needed. The embodiments described herein estimates the road grade by comparing actual measurements of vehicle thrust power ($P_{actual}$) and a nominal (expected) vehicle power ($P_{nominal}$) in nominal conditions (e.g., flat road). The formula may be represented by the equation as follows:

$$\text{Road Grade} = f\left(\frac{P_{actual} - P_{nominal}}{P_{actual}}\right). \tag{1}$$

Vehicle operating parameters that relate to the power thrust and that may be used to determine the road grade include axle torque, throttle position, engine rpm, and accelerator pedal position. An actual axle torque (i.e., measured for the current driven road) is compared with nominal axle torque that was previously recorded for a vehicle driven on a non-inclined road surface. The actual axle torque is measured at a respective acceleration $a_x$ and vehicle speed v on the current road slope θ. An equation for determining the current measured axle torque is represented by the following formula:

$$\tau_A(a_x,v,\theta)=(m_v+m_{fuel})a_x r+(m_v+m_{fuel})\sin(\theta)gr+RL(v) \tag{2}$$

where $\tau_A$ is the actual measured axle torque, $m_v$ is the vehicle mass including the load (occupants, luggage, etc), $m_{fuel}$ is the fuel mass, θ is the road slope angle, r is the wheel radius, RL is the road load previously determined from an engine calibration table, and g=9.81 m/s². The vehicle mass $m_v$ and the road slope angle θ are unknowns. That is, despite the actual mass of the vehicle being known, other factors such as the mass of occupants in the vehicle, luggage, and a possible trailer are unknowns.

The nominal (expected) axle torque is a torque measured on the vehicle that is previously recorded when the vehicle was driving on a non-inclined surface. The nominal axle torque is represented by the following formula:

$$\tau_n(a_x,v)=(m_v-m_{fuel})a_x r+RL(v) \tag{3}$$

where $\tau_n$ is the nominal axle torque, $m_v$ is the vehicle mass, $m_{fuel}$ is the fuel mass, r is the wheel radius, RL is the road load previously determined from an engine calibration table, and g=9.81 m/s². In eq. (3), the mass of the vehicle is an unknown. As a result, eqs. (2) and (3) provide us with two equations and two unknowns. Therefore, the road angle may be determined by solving one of the equations for vehicle mass $m_v$ and substituting the solved for vehicle mass equation into the other equation. The road slope angle θ is then solved for in terms of the known variables. The road grade estimate utilizing axle torque is represented by the following formula:

$$K_{RGE} = \sin(\theta) = \left(\frac{\tau_A - \tau_n}{\tau_n - RL}\right) \cdot \left(\frac{a_x}{g}\right) \quad (4)$$

$K_{RGE}$ represents the road grade. It varies from −1 to 1. In eq. (4), if the $K_{RGE}$ is in the range $-1 < K_{RGE} < 0$, then the slope is downhill. If the $K_{RGE}$ is 0, then the slope is non-inclined. If the $K_{RGE}$ is in the range $0 < K_{RGE} < 1$, then the slope is uphill.

Figures 2, 3:
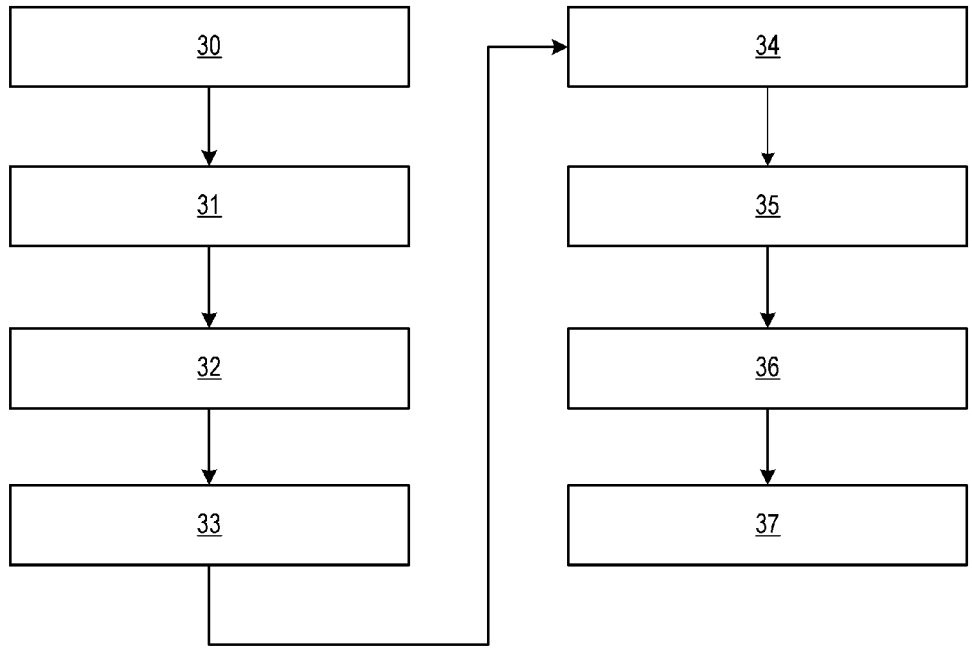
FIG. 2 is an exemplary table of fuel economy indices.
FIG. 3 is a flowchart of a method for estimating the road grade.

The road grade estimation $K_{RGE}$ is then used to determine an adjusted fuel economy index (EcoIndex$_{adjusted}$) for the current driven road. To determine the adjusted fuel economy index (EcoIndex$_{adjusted}$), a fuel economy index for a non-inclined road (EcoIndex$_{non-inclined}$) is first determined. The fuel economy index (EcoIndex$_{non-inclined}$) is preferably obtained by a pre-generated index table. FIG. 2 illustrates an example of the fuel economy index values for a vehicle traveling on a non-inclined road. The fuel economy index values are provided as a function of acceleration and velocity of table. The table is pre-determined for a respective vehicle model. It should be understood that the values in the table shown therein are exemplary and may be vary between different model vehicles. The x-axis represents the acceleration (g) and the y-axis represents the velocity (mph).

The vehicle acceleration and velocity by the vehicle for the current driven road are measured and recorded. Based on the combination of the measured acceleration and velocity, a fuel economy index is obtained from the table. For example, in FIG. 2, a measured acceleration of 0.1 g and measured velocity of 60 mph would provide a fuel economy index of 11.07. It should be understood that the table represents indices for a non-inclined surface. Once a respective fuel economy index (EcoIndex$_{non-inclined}$) is obtained from table, the fuel economy index (EcoIndex$_{non-inclined}$) is adjusted to compensate for the inclined surface that the vehicle is currently be driven along. The adjusted fuel economy index (EcoIndex$_{adjusted}$) for the current road grade is determined based on a function of the fuel economy index (EcoIndex$_{non-inclined}$) and the road grade estimation $K_{RGE}$. The adjusted fuel economy index (EcoIndex$_{adjusted}$) is represented by the following formula:

$$\text{EcoIndex}_{adjusted} = K_{RGE} \cdot \text{EcoIndex}_{non-inclined} \quad (5)$$

The output from eq. (5) will result in a positive value if the vehicle is traveling along a downhill slope, or the index will result in a negative value if the vehicle is traveling along an uphill slope, or the index will be zero if the vehicle is traveling along a non-inclined slope.

The adjusted fuel economy index EcoIndex$_{adjusted}$ may be utilized by the electronic control unit for enhancing the accuracy and operation of powertrain operations that include, but are not limited to, instant fuel economy indicators (IFE), manual shift advising, and acceleration profile advising, that utilize fuel economy as a factor.

In a second preferred embodiment, the throttle position may be used as a vehicle operating parameter that relates to the power thrust as an alternative for axle torque when axle torque sensing is not available on a vehicle. A throttle position measured while vehicle is driving along the road is compared with a throttle position previously recorded for a vehicle driven on a non-inclined road surface. The actual throttle position is measured at a respective acceleration $a_x$ and vehicle speed v on the current road slope θ. The nominal (expected) throttle position is a previously recorded measurement obtained when the vehicle was driving under nominal conditions (i.e., on a non-inclined surface) at a same acceleration and velocity. The formula for determining the road grade estimate $K_{RGE}$ as a function of the throttle position is represented by the following formula:

$$K_{RGE} = \sin(\theta) = \frac{T_A - T_n}{T_n} \cdot f\left(\frac{T_n}{T_{n,0}}\right) \quad (6)$$

where $T_A$ is the actual value of the throttle position at a respective acceleration $a_x$ on the road slope θ, $T_n$ is the nominal value of the throttle position on a substantially non-sloping surface, and $$f\left(\frac{T_n}{T_{n,0}}\right)$$

is a compensation factor for changes in a mass of the vehicle. $T_{n,0}$ is a factory setting data that is measured at a nominal throttle position under nominal conditions with no load. The road grade estimate $K_{RGE}$ determined using the throttle position as the vehicle operating parameter may be used to determine the adjusted fuel economy index (EcoIndex$_{adjusted}$) as described using eq. (5).

In a third preferred embodiment, the accelerator pedal position may be used as a vehicle operating parameter relating to the power thrust. In utilizing the accelerator pedal position of the vehicle, a position of the accelerator pedal measured while a vehicle is driving along the road is compared with accelerator pedal position previously recorded for the vehicle driven on a non-inclined road surface. The accelerator pedal position is measured at a respective acceleration $a_x$ and vehicle speed v on the current road slope θ. The nominal (expected) accelerator pedal position is a previously recorded measurement that is obtained when the vehicle was driving under nominal conditions (i.e., on a non-inclined surface) at a same acceleration and velocity. The formula determining the road grade estimate $K_{RGE}$ as a function of the accelerator pedal position is represented by the following formula:

$$K_{RGE} = \sin(\theta) = \frac{A_A - A_n}{A_n} \cdot f\left(\frac{A_n}{A_{n,0}}\right) \quad (7)$$

where $A_A$ is the actual value of the accelerator pedal position for maintaining an acceleration $a_x$ at a velocity v on the road slope θ, $A_n$ is the nominal value of the actual accelerator pedal position for maintaining an acceleration $a_x$ at a velocity v on the substantially non-sloping surface, and $$f\left(\frac{A_n}{A_{n,0}}\right)$$

is the compensation factor for changes in the mass of the vehicle. $A_{n,0}$ is a factory setting data based on a nominal throttle position under nominal conditions with no load. The road grade estimate $K_{RGE}$ may then be used to determine the adjusted fuel economy index (EcoIndex$_{adjusted}$) as described using eq. (5).

In a fourth preferred embodiment, the actual engine rpm may be used as a vehicle operating parameter that relates to the power thrust. In utilizing the actual engine rpm of the vehicle, the engine rpm measured while the vehicle is driving along the road is compared with engine rpm previously recorded for a vehicle driven on a non-inclined road surface. The engine rpm is measured at a respective acceleration $a_x$ and vehicle speed v on the current road slope θ. The nominal (expected) engine rpm is a previously recorded measurement that is obtained when the vehicle was driving under nominal conditions (i.e., on a non-inclined surface) at a same acceleration and velocity. The formula for determining the road grade estimate $K_{RGE}$ as a function of the engine rpm is represented by the following formula:

$$K_{RGE} = \sin(\theta) = \frac{rpm_A - rpm_n}{rpm_n} \cdot f\left(\frac{rpm_n}{rpm_{n,0}}\right) \quad (8)$$

where $rpm_A$ is the actual value of the engine rpm for maintaining an acceleration $a_x$ at a velocity v on the road slope θ, $rpm_n$ is the nominal value is the engine rpm for maintaining an acceleration $a_x$ at a velocity v on the substantially non-sloping surface, and $$f\left(\frac{rpm_n}{rpm_{n,0}}\right)$$

is the compensation factor for changes in the mass of the vehicle. The road grade estimate $K_{RGE}$ may then be used to determine the adjusted fuel economy index ($EcoIndex_{adjusted}$) as described using eq. (5).

FIG. 3 illustrates a flowchart of a method for estimating a road grade angle of inclination. In step 30, a nominal value of a vehicle operating parameter is measured during a nominal operating condition where the vehicle operating parameter is related to vehicle thrust power. The vehicle operating parameter is selected from the group including, but not limited to, the axle torque, engine rpm, throttle position, and accelerator pedal position. The nominal value of the vehicle operating parameter is paired with each value of nominal acceleration that occurs on a non-inclined surface with the vehicle operations parameter at the nominal value.

In step 31, the nominal value of the vehicle operating parameter and nominal acceleration are stored in a memory.

In step 32, an actual value of the vehicle operating parameter is determined during a current vehicle operating condition.

In step 33, a vehicle acceleration is measured corresponding to the actual value of the vehicle operating parameter.

In step 34, the road grade is estimated as a function of a comparison between the measured acceleration value and the nominal acceleration value that would be expected for the actual value of the vehicle operating parameter.

In step 35, a fuel economy index is determined from a pre-generated table based on the measured acceleration and velocity.

In step 36, an adjusted fuel economy index is determined as a function of the fuel economy index and road grade estimation.

In step 37 the adjusted fuel economy index is used for enhancing the accuracy fuel economy indicator that is used in a respective powertrain advising operation. The respective powertrain advising operation includes, but is not limited to, instant fuel economy indicators (IFE), manual shift advising, and acceleration profile advising.

While certain embodiments of the present invention have been described in detail, those familiar with the art to which this invention relates will recognize various alternative designs and embodiments for practicing the invention as defined by the following claims.

What is claimed is:

1. A method of estimating a road grade of a current driven road by a vehicle, the method comprising the steps of:
   measuring a nominal value of a vehicle operating parameter during a nominal vehicle operating condition, the vehicle operating parameter being related to a vehicle thrust power, the nominal value of the vehicle operating parameter being comprised of a nominal acceleration in a driven direction of travel, the nominal value corresponding to the nominal value of the operating parameter when the vehicle is driven on a substantially non-inclined road;
   storing the nominal value of the operating parameter and nominal acceleration in a memory;
   determining an actual value of the vehicle operating parameter during a current vehicle operating condition;
   measuring the vehicle acceleration in the driven direction of travel corresponding to the actual value of the vehicle operating parameter; and
   estimating the road grade of the current driven road as a function of a comparison between the measured acceleration value and the nominal acceleration that would be expected for the actual value of the vehicle operating parameter;
   wherein in the vehicle operating parameter is an axle torque; and
   wherein the road grade estimate is represented by the following formula:

$$K_{RGE} = \sin(\theta) = \frac{\tau_A - \tau_n}{\tau_n - RL} \cdot \frac{a_x}{g}$$

where $\tau_A$ is the actual value of the axle torque at the vehicle acceleration $a_x$ and vehicle speed v on a road slope θ, $\tau_n$ is the nominal value of the axle torque on a substantially non-sloping surface, RL is a road load, and g is a gravity constant.

2. The method of claim 1 wherein a fuel economy index based on a substantially non-inclined surface is determined as a function of engine-generated acceleration and a vehicle velocity.

3. The method of claim 2 wherein an adjusted fuel economy index for the current road grade is determined based on a function of the fuel economy index and the road grade estimation.

4. The method of claim 3 wherein adjusted fuel economy index is represented by the following equation:

$$EcoIndex_{adjusted} = K_{RGE} \cdot EcoIndex_{non\text{-}incline}$$

where $EcoIndex_{non\text{-}incline}$ is the fuel economy index based on a non-incline surface, and $K_{RGE}$ is the road grade estimation.

5. The method of claim 4 wherein the adjusted fuel economy index is used in a powertrain advising operation for identifying an instant fuel economy to the driver of the vehicle.

6. The method of claim 4 wherein the adjusted fuel economy index is used in a powertrain advising operation for advising a driver when to shift gears in a manual transmission for enhancing fuel economy.

7. The method of claim 4 wherein the adjusted fuel economy index is used in a powertrain advising operation for generating an acceleration profile used by a driver for enhancing fuel economy.

8. A method of estimating a road grade of a current driven road by a vehicle, the method comprising the steps of:

measuring a nominal value of a vehicle operating parameter during a nominal vehicle operating condition, the vehicle operating parameter being related to a vehicle thrust power, the nominal value of the vehicle operating parameter being comprised of a nominal acceleration in a driven direction of travel, the nominal value corresponding to the nominal value of the operating parameter when the vehicle is driven on a substantially non-inclined road;

storing the nominal value of the operating parameter and nominal acceleration in a memory;

determining an actual value of the vehicle operating parameter during a current vehicle operating condition;

measuring the vehicle acceleration in the driven direction of travel corresponding to the actual value of the vehicle operating parameter; and estimating the road grade of the current driven road as a function of a comparison between the measured acceleration value and the nominal acceleration that would be expected for the actual value of the vehicle operating parameter;

wherein the vehicle operating parameter is a position of a throttle of the vehicle; and wherein the road grade estimate is represented by the following formula:

$$K_{RGE} = \sin(\theta) = \frac{T_A - T_n}{T_n} \cdot f\left(\frac{T_n}{T_{n,0}}\right)$$

where $T_A$ is the actual value of the throttle position at a respective acceleration $a_x$ on the road slope $\theta$, $T_n$ is the nominal value of the throttle position on a substantially non-sloping surface, and $$f\left(\frac{T_n}{T_{n,0}}\right)$$

is a compensation factor for changes in a mass of the vehicle.

9. The method of claim 8 wherein a fuel economy index based on a substantially non-inclined surface is determined as a function of engine-generated acceleration and a vehicle velocity.

10. The method of claim 9 wherein an adjusted fuel economy index for the current road grade is determined based on a function of the fuel economy index and the road grade estimation.

11. A method of estimating a road grade of a current driven road by a vehicle, the method comprising the steps of:

measuring a nominal value of a vehicle operating parameter during a nominal vehicle operating condition, the vehicle operating parameter being related to a vehicle thrust power, the nominal value of the vehicle operating parameter being comprised of a nominal acceleration in a driven direction of travel, the nominal value corresponding to the nominal value of the operating parameter when the vehicle is driven on a substantially non-inclined road;

storing the nominal value of the operating parameter and nominal acceleration in a memory;

determining an actual value of the vehicle operating parameter during a current vehicle operating condition;

measuring the vehicle acceleration in the driven direction of travel corresponding to the actual value of the vehicle operating parameter; and estimating the road grade of the current driven road as a function of a comparison between the measured acceleration value and the nominal acceleration that would be expected for the actual value of the vehicle operating parameter;

wherein the vehicle operating parameter is an accelerator pedal position of the vehicle; and wherein the road grade estimate is represented by the following formula:

$$K_{RGE} = \sin(\theta) = \frac{A_A - A_n}{A_n} \cdot f\left(\frac{A_n}{A_{n,0}}\right)$$

where $A_A$ is the actual value of the accelerator pedal position for maintaining an acceleration $a_x$ at a velocity v on the road slope $\theta$, $A_n$ is the nominal value of the actual accelerator pedal position for maintaining an acceleration $a_x$ at a velocity v on the substantially non-sloping surface, and $$f\left(\frac{A_n}{A_{n,0}}\right)$$

is the compensation factor for changes in the mass of the vehicle.

12. The method of claim 11 wherein a fuel economy index based on a substantially non-inclined surface is determined as a function of engine-generated acceleration and a vehicle velocity.

13. The method of claim 12 wherein an adjusted fuel economy index for the current road grade is determined based on a function of the fuel economy index and the road grade estimation.

14. A method of estimating a road grade of a current driven road by a vehicle, the method comprising the steps of:

measuring a nominal value of a vehicle operating parameter during a nominal vehicle operating condition, the vehicle operating parameter being related to a vehicle thrust power, the nominal value of the vehicle operating parameter being comprised of a nominal acceleration in a driven direction of travel, the nominal value corresponding to the nominal value of the operating parameter when the vehicle is driven on a substantially non-inclined road;

storing the nominal value of the operating parameter and nominal acceleration in a memory;

determining an actual value of the vehicle operating parameter during a current vehicle operating condition;

measuring the vehicle acceleration in the driven direction of travel corresponding to the actual value of the vehicle operating parameter; and estimating the road grade of the current driven road as a function of a comparison between the measured acceleration value and the nominal acceleration that would be expected for the actual value of the vehicle operating parameter;

wherein the nominal vehicle operating parameter is an engine rpm of the vehicle; and wherein the road grade estimate is represented by the following formula:

$$K_{RGE} = \sin(\theta) = \frac{rpm_A - rpm_n}{rpm_n} \cdot f\left(\frac{rpm_n}{rpm_{n,0}}\right)$$

where $rpm_A$ is the actual value of the engine rpm for maintaining an acceleration $a_x$ at a velocity v on the road slope $\theta$, $rpm_n$ is the nominal value is the engine rpm for maintaining an acceleration $a_x$ at a velocity v on the substantially non-sloping surface, and $$f\left(\frac{rpm_n}{rpm_{n,0}}\right)$$

is the compensation factor for changes in the mass of the vehicle.

15. The method of claim 14 wherein a fuel economy index based on a substantially non-inclined surface is determined as a function of engine-generated acceleration and a vehicle velocity.

16. The method of claim 15 wherein an adjusted fuel economy index for the current road grade is determined based on a function of the fuel economy index and the road grade estimation.

* * * * *